July 23, 1940.     V. VILLETTE     2,209,097
COMPRESSED AIR COOLING SYSTEM
Filed Sept. 15, 1939
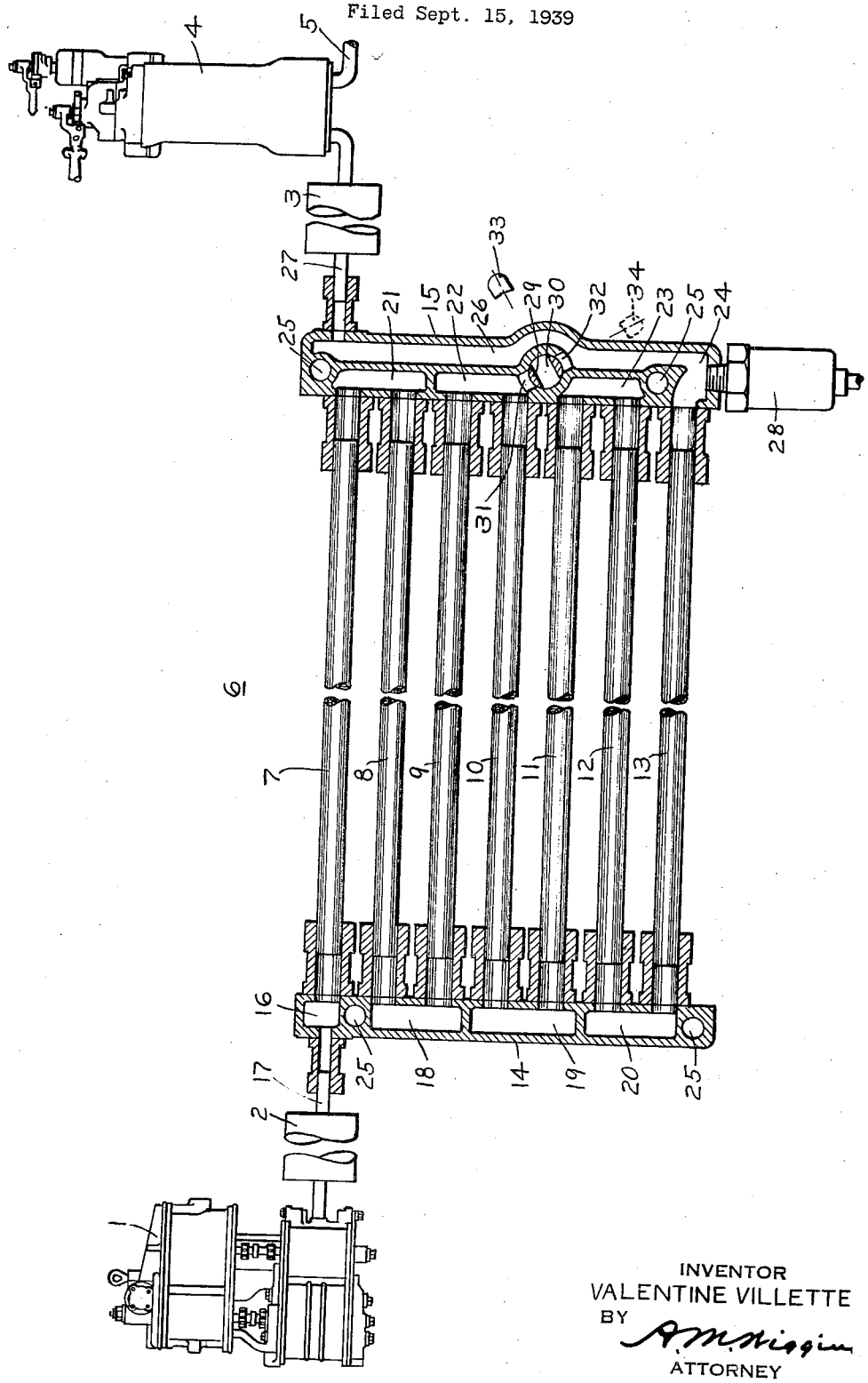
INVENTOR
VALENTINE VILLETTE
BY
ATTORNEY Patented July 23, 1940

2,209,097

UNITED STATES PATENT OFFICE 2,209,097

COMPRESSED AIR COOLING SYSTEM

Valentine Villette, Oakland, Calif., assignor to The Westinghouse Air Brake Company, Wilmerding, Pa., a corporation of Pennsylvania Application September 15, 1939, Serial No. 295,096

9 Claims. (Cl. 303—1)

This invention relates to compressed air cooling systems and more particularly to means for removing moisture from the compressed air used in fluid pressure brake systems.

When air is taken from the atmosphere and compressed and then permitted to cool some of the moisture originally present in the air is generally precipitated. In air brake systems the compressors employed for compressing the air draw the air directly from the atmosphere, compress it, and then deliver it to one or more storage reservoirs. If the air is supplied from these reservoirs to the brake system before it has been cooled substantially to ambient temperature, then as the warm air strikes the cool parts of the air brake system some of the moisture present in the air will be precipitated. The presence of moisture in the devices of the air brake system is detrimental to their proper operation. This is particularly true in cold weather when accumulated moisture may freeze and wholly block or restrict the flow of air through passages in the devices, or impede the operation of valve parts. Again, in warm weather the presence of moisture in pipes and cast iron portions of the devices may produce rusting and rust scale which as will be obvious is also undesirable.

It is therefore important that before compressed air is delivered to the parts of an air brake system as much water should be removed from the air as is practicable. One generally employed method of doing this is to connect a coil of radiating pipe between the air compressor and the storage reservoir or reservoirs on the locomotive, so that the warm compressed air delivered from the compressor will be cooled before reaching the storage reservoirs on the locomotive.

This cooling of the compressed air frees a portion of the moisture therein which collects in the main reservoir where it may be drawn away and, as will be obvious, prevents the passing of free moisture into the air brake system along with the compressed air supplied thereto.

Most generally the coil of radiating pipe has heretofore been made a fixed length. However, as will be obvious this fixed length cannot meet all weather conditions. If it is sufficient to provide the proper cooling for hot weather conditions then for cold weather conditions this length will be greater than is required, so that compressed air passing through the coil of pipe may be cooled to a much lower degree than is desirable, with the result that some freezing may take place within the pipe, which is intolerable. In case the radiating pipe provides only for proper cooling for cold weather conditions, then inadequate cooling will result in hot weather conditions so that further cooling and precipitation of moisture will occur upon supplying such air to the devices of the air brake system which are at a lower temperature.

It is therefore desirable that some provision be made for regulating the cooling effect of the cooling means on the compressed air passed therethrough so that the proper cooling will be effected for both hot weather and for cold weather conditions.

Accordingly, one object of the present invention is to provide an improved regulatable cooling means for cooling the compressed air delivered by a compressor to an air brake system.

Another object of the invention is to provide an improved heat radiating apparatus for radiating the heat from compressed air, which apparatus is compact and which is readily adaptable for mounting in the limited space available on modern railway locomotives.

Other objects will be apparent from the following more detailed description of the invention.

In the accompanying drawing, the single figure is a diagrammatic view of those parts of a locomotive brake equipment which are pertinent to an understanding of the present invention and with which said invention is associated.

In the drawing the reference numeral 1 indicates an air compressor, the reference numerals 2 and 3 indicate two main reservoirs, and the reference numeral 4 indicates an engineer's brake valve device; these parts representing well known parts of air brake apparatus employed on railway locomotives. The air compressor 1 may be of any desired type, but for the purpose of illustration is shown as of the type adapted to be operated by steam taken from the locomotive boiler to draw air from the atmosphere and to compress said air and discharge same into the main reservoir 2. Air thus supplied to the main reservoir 2 is adapted to flow therefrom to the second main reservoir 3 and thence to the brake valve device 4. The brake valve 4 is provided for controlling communication between the main reservoir 3 and a brake controlling pipe 5, which may be the well known brake pipe, through which extends through a train and through which fluid under pressure from the main reservoirs 2 and 3 is adapted to be transmitted to the brake system of a train.

According to the present invention there is interposed in the connection between the main reservoirs 2 and 3 an improved heat radiating device, indicated generally by the reference numeral 6, which is adapted to cool the air delivered by the air compressor 1 through the main reservoir 2 and supplied to the main reservoir 3.

The radiating device 6 comprises a plurality of parallel arranged heat radiating pipes numbered 7 to 13, inclusively, which may be of any desired length and size and shape in section and which are preferably made from a material, such as copper, having a relatively high heat radiating capacity.

The radiating pipes 7 to 13 are all connected at one end, through the medium of suitable connectors, to an air inlet header 14 and at the opposite ends to an air outlet header 15, said headers being provided with suitable bolt holes 25 through which bolts (not shown) are adapted to be employed for securing the device to a suitable part of the locomotive in a position with the several pipes arranged substantially one above the other and extending substantially in a horizontal direction.

The air inlet header 14 has a cavity 16 to which the pipe 7 is connected and is also connected by a pipe 17 to the main reservoir 2. This header also has a cavity 18 establishing communication between the connected ends of pipes 8 and 9, a cavity 19 providing communication between pipes 10 and 11 and a cavity 20 connecting in like manner the pipes 12 and 13.

In the outlet header 15 there are provided a cavity 21 connecting pipes 7 and 8, a cavity 22 connecting pipes 9 and 10, a cavity 23 connecting pipes 11 and 12 and a cavity 24 to which the adjacent end of the pipe 13 is connected. The cavity 24 is connected to one end of a passage 26 which extends vertically through the header to the top portion thereof where it is connected to one end of a pipe 27 which leads to the main reservoir 3.

It will be apparent from the above description that the radiating pipes 7 to 13, inclusive, are connected in series with the pipe 7 at one end of the system and the pipe 13 at the other end of the system. All of the pipes are thus serially effective to reduce the temperature of the air which flows therethrough to the main reservoir 3 and it is intended that the combined heat dissipating capacities of all of these pipes will insure the temperature of the air delivered to the main reservoir 3 being substantially equal to that of the atmosphere for all atmospheric temperatures above a certain low degree.

All moisture precipitated in the cooling pipes 7 to 13 during the flow of air therethrough will be carried along with the stream of air to the cavity 24 and will thence flow by gravity into an automatic drain valve device 28 which is secured to the bottom of the header 15. The automatic drain device 28 may be of any desired well known type adapted to periodically operate to discharge collected water therefrom, such, for example, as disclosed in Patent No. 1,278,118, issued on September 10, 1918, to T. W. Demarest. By this arrangement the cavity 24 will be maintained substantially free of moisture at all times.

It will be noted that the top wall of cavity 24 is curved downwardly in the direction of the drain valve. The purpose of this is to deflect moisture toward the drain valve 28 and out of the stream of compressed air as it travels from pipe 13 through cavity 24 to the outlet passage 26, thus minimizing moisture in the form of water passing along with the air through said passage to the main reservoir 3.

In order to vary the cooling effect of the radiating device 6 on the compressed air passed therethrough, a by-pass cock 29 is provided in the outlet header 15. This by-pass cock has a waterway 30 adapted to be connected at one end to a passage 31 leading to cavity 22 and at the opposite end to a passage 32 leading to the outlet passage 26 to thereby open a communication between the radiator pipe 9 and passage 26 and thus by-pass the radiator pipes 10 to 13.

In the drawing the by-pass cock 29 is shown in a closed position in which it closes communication between the passages 31 and 32 to render the entire radiating device comprising all of the pipes 7 to 13 effective. A handle 33 is provided for turning the by-pass cock 29 from the closed position to an open position in which the waterway 30 connects passages 31 and 32, this open position of handle 33 being indicated by the reference numeral 34.

When the by-pass cock 29 is turned to the open position just described, compressed air upon entering the cavity 22 from pipe 9 will flow through the plug valve 29 directly to passage 26 and thence to the main reservoir 3; only the pipes 7, 8 and 9 being effective with the cock 29 in open position to cool the air supplied to the main reservoir 3, as will be evident. By this arrangement, the temperature of the air delivered to the main reservoir 3 will never be reduced sufficiently low to permit freezing of precipitated moisture in the cooling pipes 7, 8 and 9 of the radiator unit thereby ensuring even at or below freezing temperatures the supply of compressed air to the main reservoir 3.

The flow capacity of the passages 31 and 32 and of waterway 30 in plug valve 29 equals or exceeds that of pipes 7, 8 and 9 to supply air to cavity 22. It will therefore be evident that with the by-pass cock 29 in the open position, the same air pressure will be acting at the right hand ends of pipes 10 and 13 so that there will be no appreciable flow of air through said pipes. The turning of the by-pass cock to this position therefore renders the pipes 10 to 13 substantially ineffective although not closing communication therethrough. Any moisture which may be precipitated in the pipes 7 to 9 will, under this condition, be carried by the stream of air through the plug valve 29 to the passage 26 and then drop by gravity to the drain valve device 28. It will be noted that the communication through the plug valve is so arranged that the moisture passing therethrough will be directed downwardly into passage 26 and thus out of the air stream which has to pass upwardly for flow to the main reservoir 3.

It will now be apparent that the use of the improved radiating device will minimize under all operating conditions of a train the precipitation of moisture in the brake system thereof and thus avoid insofar as possible braking difficulties incident to water in the brake system.

The improved radiator is relatively simple and compact and designed to occupy less space than required for the cooling coils heretofore employed, and its use will ensure on each locomotive an air cooling system which is adequate for the purpose intended.

While one illustrative embodiment of the invention has been described in detail it is not the intention to limit its scope to that embodiment or otherwise than by the terms of the appended claims.

Having now described my invention, what I claim as new and desire to secure by Letters Patent, is:

1. A system for cooling compressed air delivered from a compressor to a reservoir for use in an air brake system, comprising in combination, cooling means interposed between the compressor and the reservoir and arranged to cool warm compressed air flowing from the compressor to the reservoir, control means for varying the degree of cooling effect of said cooling means on the compressed air supplied to said reservoir, and means for controlling said control means.

2. A system for cooling compressed air delivered from a compressor to a reservoir for use in an air brake system, comprising in combination, radiator means connected between said compressor and said reservoir and comprising sections thereof through which warm compressed air flows and is cooled, control means for opening and closing an outlet communication from said radiator means to said reservoir around at least one of said sections to vary the cooling effect of said radiator means on the air supplied to said reservoir, and actuating means for said control means.

3. A system for cooling compressed air delivered from a compressor to a reservoir for use in an air brake system, comprising in combination, radiator means connected between said compressor and said reservoir and having sections thereof through which warm compressed air flows and is cooled, and a valve device for opening and closing a communication between one of said sections and said reservoir around another of said sections.

4. A heat radiating system for fluid under pressure employed in an air brake system, comprising, an air compressor, a main reservoir for storing compressed air for use in said air brake system, and conductor means connecting said compressor to said reservoir for conveying air compressed by said compressor to said reservoir, said conductor means comprising a plurality of radiator sections adapted to dissipate heat from the air passing therethrough enroute to said reservoir, and valve means operable to selectively open or close a communication between said conductor means and reservoir around at least one of said radiator sections.

5. A heat radiating system for fluid under pressure employed in an air brake system, comprising, an air compressor, a main reservoir for storing compressed air for use in said air brake system, and conductor means connecting said compressor to said reservoir for conveying air compressed by said compressor to said reservoir, said conductor means comprising heat radiating apparatus adapted to dissipate heat from the air passing therethrough enroute to said reservoir, and valve means operable at will to either render all of said apparatus effective or to open a communication between said apparatus and reservoir around a portion of said apparatus.

6. A compressed air supply system for air brake apparatus of railway trains comprising in combination, an air compressor, a main reservoir for storing compressed air for use in said air brake apparatus, and conductor means connecting said compressor to said reservoir for conveying air compressed by said compressor to said reservoir, said conductor means including a plurality of heat radiating sections for dissipating heat from the air supplied to said reservoir, and valve means operable to open a communication through said conductor means between said compressor and reservoir including less than all of said heat radiating sections.

7. A compressed air supply system for air brake apparatus of railway trains comprising in combination, an air compressor, a main reservoir for storing compressed air for use in said air brake apparatus, air cooling apparatus arranged in an air conveying system connecting said compressor to said reservoir, and having at least two outlets through which air is adapted to flow to said reservoir, said outlets being so arranged that the air flow from said compressor to said reservoir will be either through a portion or the whole of said apparatus, and a valve for opening and closing communication through one of said outlets.

8. Radiating means for cooling the compressed air supplied by an air compressor to a main reservoir for use in an air brake system, said radiating means comprising a plurality of heat radiating sections through which the compressed air delivered by said compressor to said main reservoir is adapted to flow to be cooled, and a valve associated with said radiating means operable to open an air flow communication between said radiating means and reservoir around at least one of said radiating sections.

9. Radiating means for cooling the compressed air supplied by an air compressor to a main reservoir for use in an air brake system, said radiating means comprising a pair of headers, a plurality of heat radiating pipes arranged in parallel spaced relation and connected at one end to one of said headers and at the opposite end to the other of said headers, said headers having cavities connecting said pipes in series relation with each other and with an outlet communication in one header leading to said compressor and said reservoir, one of said headers having a passageway connecting said communication to one of the cavities therein and a valve in said one header arranged to either open or close communication through said passageway.

VALENTINE VILLETTE.